April 1, 1930.  W. M. SCOTT  1,752,353
CONTROL SYSTEM
Filed Dec. 3, 1926   2 Sheets-Sheet 1

INVENTOR.
William M. Scott
BY Cornelius L. Ehret
ATTORNEY.

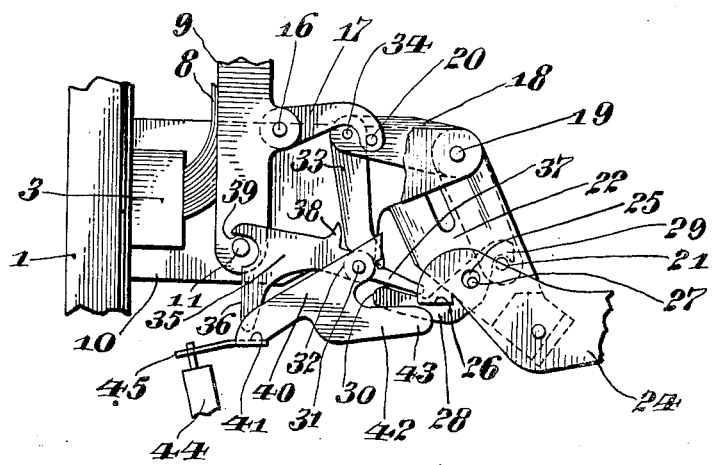
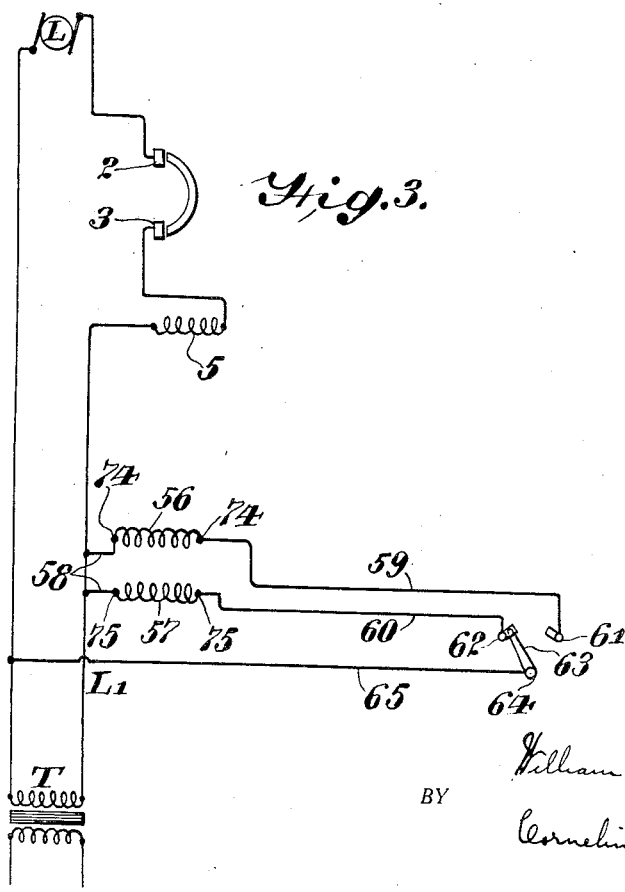

Patented Apr. 1, 1930

1,752,353

UNITED STATES PATENT OFFICE

WILLIAM M. SCOTT, OF TREDYFFRIN TOWNSHIP, CHESTER COUNTY, PENNSYLVANIA

CONTROL SYSTEM

Application filed December 3, 1926. Serial No. 152,353.

My invention relates to a method of and apparatus for controlling the operation of a switch, circuit breaker, or the like.

My invention resides in a control system for a circuit-breaker, particularly a remote control system for a non-closable circuit-breaker, wherein by the application of power controlled at a region remote from said breaker a movable structure is moved sequentially, and, more particularly, in one direction and then in reverse direction sequentially to effect a circuit-controlling operation of the circuit-breaker or switch, more particularly a circuit closing operation, and wherein a different circuit controlling operation of the switch, more particularly a circuit-opening operation, is effected by the change, more particularly the decrease or the termination of the power applied.

My invention resides in a control system for a circuit-breaker, more particularly a circuit-breaker of the nonclosable type, which may be electro-magnetically controlled or actuated as by an electro-magnet or a solenoid, and in which the cooperation between the circuit-breaker and its electro-magnetic operator is such that, after the breaker has responded to an abnormal or predetermined circuit condition, self-reclosure is prevented even though the circuit controlling or energizing the electro-magnetic actuating means for the circuit-breaker is held closed, as at a distant control station. In apparatus of this class having the usual construction, if the abnormal or predetermined circuit-current condition, in response to which the breaker has operated, continues, and the control or energizing switch of the circuit breaker operating means remains closed, the switch or breaker will be immediately closed and thereafter promptly again automatically tripped, repeating rapidly during the continuance of the abnormal condition with the result that the apparatus may be badly damaged; similarly, if the circuit-breaker has opened in response to a subnormal voltage, and the control or energizing circuit of the breaker-operating means remains closed, upon return of normal voltage, the circuit-breaker will immediately reclose regardless of whether the controlled circuit or apparatus therein is in a proper condition to be energized.

In accordance with my invention, the circuit-breaker, after it has opened from any cause, can be reclosed only by the operator at the control station, which may be more or less remote and then only by moving the control means to effect a certain sequence of movements of the electro-magnetic actuator of the circuit-breaker. To close the breaker, the operator must first move the control means to a position which will energize an electro-magnet or solenoid to detachably connect a contact-operating means and an actuator therefor, and then move the control means to a position which will energize a second electro-magnet or solenoid to effect the movement of the actuator mentioned and thereby close the breaker. The closing circuit is made part of the circuit controlled by the breaker so that the closing coil also functions as a no-voltage trip coil and is effective to open the breaker upon either a subnormal voltage condition in the controlled circuit or upon an opening of the closing circuit at the remote control station. When the breaker opens in response to any of these conditions, the detachable connection between the contact-operating means and its actuator is broken so that the breaker cannot reclose under any condition until the remote control means is properly manipulated.

Further in accordance with my invention, a non-closable circuit breaker is provided with an electro-magnetic operator comprising a solenoid or electro-magnet adapted when energized to detachably connect a contact-operating means and an actuator therefor, a second solenoid or electro-magnet adapted when energized sequentially with regard to the first solenoid or electro-magnet, to close the breaker and to maintain it closed during normal energization, and a biasing means for effecting the opening of the breaker upon complete or a predetermined partial de-energization of the second solenoid or electro-magnet.

For an illustration of an embodiment of my invention, reference is to be had to the accompanying drawings, in which:

Fig. 2 is a side elevational view of certain of the circuit breaker structure illustrated in Fig. 1.

Fig. 3 is a diagrammatic view of a control system used with the circuit breaker.

Figure 1:
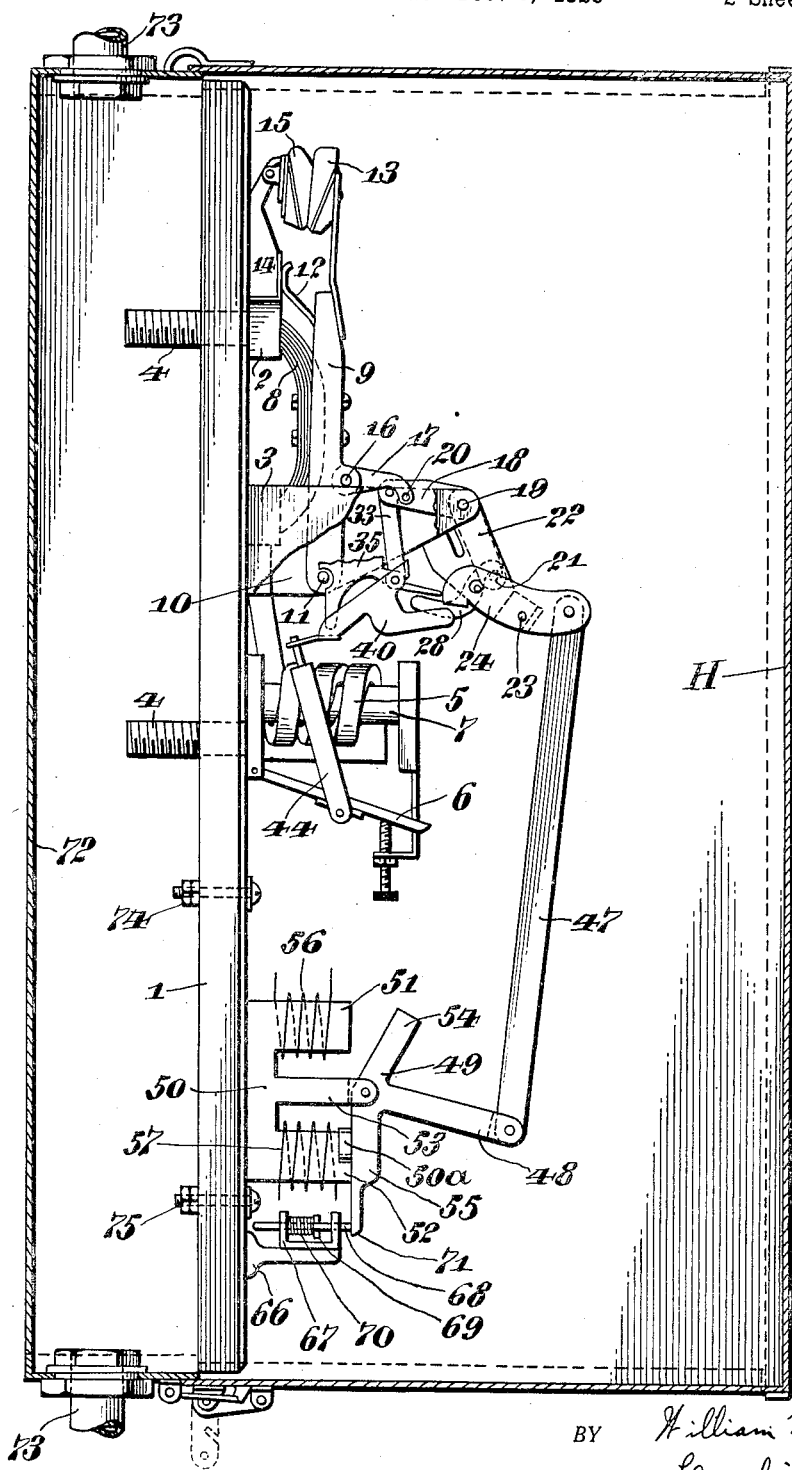
Fig. 1 is a side elevational view of the circuit breaker and its enclosing housing, the latter being shown in section.

My invention finds particular application in a system for controlling the operation of a circuit breaker, particularly a so-called "non-closable" circuit breaker or switching mechanism in which an operating or actuating member is detachably related or connected to the movable contact structure in such manner that upon occurrence of abnormal electrical condition in the circuit the relation between the actuating member and contact structure is changed or they are disconnected from each other, thus allowing the movable contact member to travel from fully or partially closed position to open position regardless of restraint upon the actuating member, and in which, in order to cause the movable contact structure to travel from the open to the closed position, the aforesaid operating or actuating member must be moved alternately in opposite directions.

Circuit-breaker structure of the character just described is well-known in the art and is exemplified in my prior Patent, No. 1,064,096, issued June 10, 1913, which, or others of corresponding type, may be substituted for the non-closable circuit breaker structure shown on the accompanying drawing as comprising a base 1 of slate, marble, or other insulating material, having secured thereto the main terminal blocks 2 and 3 with which electrical communication is afforded through the heavy current conducting studs 4. Included in the circuit between one of the studs 4 and block 3 and preferably in series relation is the coil 5 surrounding the core of a magnet 7 with which coacts an armature 6 for tripping or actuating the switch or circuit-breaker mechanism on overload or excess current as well understood in the art. However, the circuit-breaker mechanism may be tripped or operated in response to any abnormal electrical condition, as predetermined drop in voltage across the line, reversal of currents, etc.

The movable contact member 8 is adapted to bridge and electrically connect the terminal blocks 2 and 3. The member 8 is preferably a laminated bridging member and as such, particularly when very heavy currents are to be carried thereby, is, in effect, a stiff spring which is more or less compressed when in the circuit-closing position. It is secured upon the bridge arm 9 pivoted to the housing 10 at 11. The intermediate metallic shunt contact 12 and the movable shunt carbon contact 13 are also carried by the bridge arm 9, and engage, respectively, the stationary metallic shunt contact 14 and the stationary shunt carbon contact 15. When the member 8 separates from the main terminal blocks 2 and 3, the current is shunted through these shunt contacts which open in succession, the final arc occurring between the carbon contacts 13 and 15.

Pivoted to the bridge arm 9 at 16 is a pair of spaced links 17 constituting one element of a toggle, the other element of which is the angular link 18 pivoted to the housing 10 at 19. One end of link 18 is pivoted to the links 17 at 20 and the other end thereof carries a lateral pin 21 for a purpose hereinafter described.

Pivoted to the housing 10 at 19 is the bifurcated arm 22 within which is received one end of the link 18. Adjacent its free end, arm 22 carries a transverse pin 23 upon which is pivoted the actuating member or lever 24 which comprises the slot 25 and nose 26. Extending transversely through the spaced limbs of bifurcated arm 22 and the aforesaid slot 25 is a pin or member 27 pivotally supporting the latch 28 which comprises the hook-shaped extension 29 and the angular extension 30.

Supported by the housing 10 is the transverse pin or member 31 upon which is mounted the roller 32 with which engages, when the mechanism is in circuit-closing position, the end of a latch 33 pivoted at 34 to the end of toggle link 18.

Pivotally supported upon the aforesaid pin 31 is a latch actuator 35 which, as indicated in Fig. 2, comprises the angular extensions 36 and 37, a lug or abutment 38 and a recess or groove 39 in which the pin 11 is partly received. Likewise pivoted upon the pin 31 is a member 40, one end of which comprises a lateral projection 41 adapted, under circumstances as hereinafter more fully described, to engage the extension 36 of latch actuator 35. Forming a part of the member 40 is the plate or member 42 which at its end 43 engages the nose 26 of actuating member 24 during certain phases of operation of the circuit breaker mechanism. As illustrated in Fig. 1, the armature 6 has pivoted thereto a shouldered link 44, the upper end of which is slidable in member 45 secured to the aforesaid member 40.

The base 1 is detachably carried by or pivoted to a rear metal box or housing 72 by suitable hinge hook structure, such as is more fully disclosed and described in my Patent No. 1,598,750, secured to the base and engaging housing 72, whereby the base and the circuit breaker carried thereby are supported by the housing and pivoted upon it or detachably carried thereby.

Through suitable conduits 73 communicating with the interior of the housing 72 extends insulated supply conductors, not shown, connected to the studs, 4, and control-circuit wires, not shown, connected to coil terminals 74 and 75.

The switch or circuit breaker mechanism carried upon the base 1 is enclosed in the front housing H, as of sheet metal, provided adjacent its upper rear edge with hook hinges, similar to the hook hinges of the base 1, by which it is detachably carried on or pivoted to the rear housing 72 independently of the base 1.

With the circuit breaker parts in such position that the terminal blocks 2 and 3 are closed by contact member 8, upon occurrence of overload or other electrical condition in the circuit to be controlled or protected, the armature 6 will be attracted by the magnet 7, causing upward movement of link 44 until its shoulders engage member 45, whereupon member 40 will be swung in a clockwise direction, Fig. 2, its flange or lateral projection 41 engaging, with a hammer-like blow, the extension 36 of latch actuator 35 which has been prevented from dropping into engagement with projection 41 due to the engagement of pin 11 with the wall of slot 39. Latch actuator 35 is now swung in a clockwise direction and its lug 38 engages the thrust latch 33 moving the end thereof from engagement with roller 32, and the extension 37 of latch actuator 35 engages the extension 30 of latch 28, the hook-shaped extension 29 of the latter as a result being disengaged from pin 21.

Actuation of latches 33 and 28, as aforesaid, releases the circuit breaker mechanism, and the toggle comprising the pair of links 17 on the one hand, and link 18 on the other hand, collapses, the toggle center 20 moving downwardly, Fig. 2, and the pin 21 at the free end of toggle link 18 moving in a counter-clockwise direction around the pin 19 as an axis. The arm 22 is thereby disconnected from the toggle. As the toggle collapses, bridge arm 9 and the contact member 8 carried thereby are swung in a clockwise direction, Fig. 2, about the pin 11 as an axis, and the circuit is opened at the terminal blocks 2 and 3.

In accordance with my invention actuating member 24 has a normal bias toward the position corresponding with closed position of the circuit breaker due to its own weight as well as that of 47 and structure connected thereto. In order, therefore, to bring the circuit breaker from the open to the closed position, the actuating member 24 must first be lifted into latched engagement with the operating arm 18, and thereafter when moved in the opposite direction into its normal position it thereby actuates the operating arm 18 to rotate the movable element of the circuit breaker into the closed position. This is effected as follows:

In moving member 24 upwardly, there is or may be a slight rotation of this element about pivot 23 but, when the lost motion due to slot 25 is taken up, the arm 22 which, as stated, is pivoted thereto at 23, is swung in a counter-clockwise direction around its pivot 19, carrying the latch 28 in the same direction until its hook-shaped extremity 29 is brought into engagement with and hooked around pin 21. When thereafter downward movement of actuating member 24 is initiated, as a result, arm 22 is swung in a clockwise direction on its pivot 19 carrying toggle member 18 in the same direction to move the toggle center 20 upwardly, Fig. 2, the latch 33 meanwhile swinging in a clockwise direction under the influence of gravity or a suitable biasing spring, not shown, until finally the free end of said latch 33 passes into coacting relation with roller 32. As the toggle is thus moved toward extended position, bridge arm 9 and contact member 8 are swung in a counter-clockwise direction, Fig. 2, and just before latch 33 moves into locking engagement with roller 32, the contact member 8 closes the circuit across the terminal blocks 2 and 3.

As hereinbefore stated, circuit breaker structure of the type herein described is non-closable in character and, therefore, if overload or other predetermined abnormal condition exists when contact 13 comes into engagement with contact 15, armature 6 will be immediately attracted by magnet 7 and the circuit-breaker will open in the manner previously explained.

The circuit-breaker may be opened at any time regardless of circuit conditions by causing the lever 24 to move in a counter-clockwise direction about its pivot 23, such movement being permitted due to the presence of slot 25. Accordingly, nose 26 of the lever strikes the end 43 of member 42 moving member 40 in a clockwise direction with resultant engagement of the lateral end portion 41 of member 40 with extension 36 of the latch actuator 35. The latter, thereupon is swung in a clockwise direction and by its lug 38 and extension 37 releases the latches 33 and 28 and the circuit-breaker flies to open position. This phase of the operation of the switch may be termed "a reverse-movement, tripping operation".

In order to adapt the circuit breaker for operation from a distance, it is provided with a structure by means of which the upward and downward movements essential to the control of the circuit breaker are effected, preferably magnetically. One of the forms which this part of my invention may take is shown in Fig. 1. This structure comprises a magnet 50 and a coacting armature 49, the movements of the latter being communicated to the circuit breaker by means of the link 47. The magnet which is secured to the base 1 consists of a yoke 50 from which projects the cores or pole pieces 51, 52, 53, upon the middle one of which is pivoted the armature 49 so disposed that its arms 54 and 55 may coact, respectively, with the pole faces of cores 51 and 52. Supported upon the armature is the extension 48 to which is pivoted one end of the link 47. When intended for alternating current excitation, the magnet and armature are suitably laminated after the manner well understood in the art. Disposed in suitable relation with respect to the cores 51 and 52 are the respective windings or coils 56 and 57, the ends of each being connected to two pairs of terminals 74 and 75, respectively. In addition to the foregoing, either or both of the polar extensions of cores 51 or 52 may be partially surrounded by a short circuited ring or winding 50ª with a view to modifying the intermittent nature of the magnetism induced by the coils 56 and 57 when the exciting current is alternating. Each of the coils has one terminal connected to a conductor 58. Leading, respectively, from the other terminals of coils 56 and 57 are the conductors 59 and 60 connected, respectively, to the terminals or bifurcated knife switch contacts 61 and 62 arranged to be separately engaged by the contact member or knife switch 63 pivoted to a contact or terminal 64 from which branches a conductor 65.

Conductors 58 and 65 may be energized from any suitable source of current supply but, preferably, and as shown, are connected across the line conductors L and L¹, one of which may be connected to either of the terminal blocks 2 and 3.

To operate the system hereinbefore described, assuming the circuit breaker is in the open position and it is desired to move it into the closed position, switch blade 63 is first swung on its pivot into engagement with contact 61. As a result, winding 56 is energized and armature 49 is swung in counter-clockwise directon, Fig. 1, to move link 47 and actuating member 24 upwardly, whereby, as heretofore described, arm 22 is swung in a counter-clockwise direction to carry the hook-shaped extremity 29 of latch 28 into engagement with pin 21, thereby connecting the operating arm 22 into engagement with toggle member 18; and thereafter switch blade 63 is swung in reverse direction about its pivot into engagement with contact element 62 with resultant de-energization of winding 56 and energization of winding 57. As a result, armature 49 is now swung in a clockwise direction, Fig. 1, and link 47 and actuating arm 24 are moved downwardly to swing toggle member 18 in a clockwise direction, Fig. 2, to extend the toggle and close contact member 8 upon terminal blocks 2 and 3, the parts of the circuit breaker mechanism all functioning as previously described.

Further, should an overload or other predetermined electrical condition exist upon the line when contact 13 first engages contact 15, or should such condition arise thereafter, the circuit breaker will open the circuit at once, regardless of the position of the arm 22, since, as described, the operating arm 22 is tripped free from the contact locking toggle 17, 18 during circuit-opening movement of the breaker. To reclose it, the control switch 63 must be withdrawn from contact with blade 62 and engaged with blade 61 thereby first de-energizing the winding 57 and thereafter energizing the winding 56 whereupon the armature structure 49 is rotated in a clockwise direction until its polar extension 54 comes into engagement with core 51 and through the medium of the link 47 the actuating member 24 is latched into engagement with the operating arm. Thereafter, upon movement of the operator's switch to break contact at 61 and establish it at 62, coil 56 is de-energized and coil 57 energized with resulting closure of the circuit breaker.

Heretofore the circuit breaker has been described as opening automatically in response to overload, but the operating device herein described may be so modified as to adapt it for opening the circuit breaker upon interruption of the control circuit or as the result of undue fall of voltage therein. The control circuit may obviously be derived from that of which the circuit breaker forms a part, in which case the latter becomes responsive to voltage fall or interruption in its own circuit. With these ends in view, the armature 49 is given a limited normal bias in a counter-clockwise direction as viewed in Fig. 1. To this end, as indicated in Fig. 1, there may be provided a suitable support 66 carrying a bracket 67 in whose arms is slidable a rod or member 68 carrying a lateral member 69 between which and one arm of the bracket is confined a helical spring 70. When armature 49 is swung in clockwise direction, Fig. 1, its extreme end 71 engages rod 68 to move the same toward the left, thereby compressing spring 70. Thereafter, upon occurrence of predetermined drop in voltage across the line, the magnetic effect exercised by coil 57 decreases to such extent that spring 70 becomes effective to swing armature 9 in a counter-clockwise direction, Fig. 1, moving link 47 and actuating lever 24 upwardly, the latter swinging in a counter-clockwise direction on its pivot 23, such movement being permitted due to the presence of slot 25. The breaker will then open as previously described under the reverse-movement, tripping operation.

The movement imparted by the action of the spring 70 upon the armature 49 and thence to the actuating member 24 is so limited in extent that, while sufficient to effect the opening of the circuit breaker, it is insufficient to re-engage the actuating lever 24 with the operating arm 18 which re-engagement can be brought about only by the excitation of coil 56 consequent upon connection of operator's switch 63 with blades 61. Therefore, if the voltage subsequently rises to normal, although armature 55 will be attracted with consequent movement of 47 and 22, the breaker will not reclose since the arm 22 is as yet disconnected from the toggle. To reclose the breaker 9, the remote control switch must be manipulated in the same sequence before described.

When it is desired to open the circuit breaker mechanism from the remote control station, switch blade 63 is swung on its pivot until disengaged from contact 62, thus de-energizing coil 57, whereupon the rod 68 under the influence of spring 70 becomes effective to swing armature 49 in a counter-clockwise direction to trip the circuit breaker mechanism in the same manner as upon voltage failure.

It is an important feature of this invention that, regardless of the cause of the opening of the switch whether it is an overload or under-voltage conndition, in which cases the coil 57 remains energized, or upon intentional tripping by the operator at a remote point, in which case coil 57 is deenergized, the breaker cannot be reclosed, either automatically upon the continued energization of coil 57 if there is a return of normal voltage, or by manipulation of the remote control switch, unless there is a definite sequential operation of the control switch, first establishing a circuit through coil 56, and then through coil 57.

It shall be understood that my invention comprehends the control at a remote point, of the application of force to the movable structure of a "non-closable" switch different in structure from that described and responsive to conditions other than overload, and by an electro-magnetic operator, other than that shown and described.

What I claim is:

1. A control system comprising non-closable switching mechanism including an operating structure, means operative for effecting an application of power to move said structure in one direction and thereafter in another direction to perform a circuit-controlling operation, and subsequently operative to change the magnitude of said power to effect thereby a different circuit-controlling operation, and means forming part of said first-named means and disposed in a region remote from said mechanism.

2. A control system comprising non-closable switching mechanism including an operating structure, means operative for effecting an application of power to move said structure in one direction and thereafter in another direction to perform a circuit-closing operation, and subsequently operative to change the magnitude of said power to effect thereby a circuit-opening operation, and means forming part of said first named means and disposed in a region remote from said mechanism.

3. A control system comprising non-closable switching mechanism including an operating structure, means operative for effecting an application of power to move said structure in one direction and thereafter in another direction to perform a circuit-controlling operation, and subsequently operative to terminate the application of said power to effect thereby a different circuit-controlling operation, and means forming part of said first-named means and disposed in a region remote from said mechanism.

4. A control system comprising non-closable switching mechanism including an operating structure, means operative for effecting an application of power to move said structure in one direction and thereafter in another direction to perform a circuit-closing operation, and subsequently operative to terminate the application of said power to effect thereby a circuit-opening operation, and means forming part of said first-named means and disposed in a region remote from said mechanism.

5. A control system comprising non-closable switching mechanism including an operating structure, motive-power means operable to impart movement to said structure and in different directions, and a remote control member for said means movable to a position for effecting an application of power to move said structure in one direction, and movable to a second position for effecting an application of power to move said structure in another direction, said movements effecting a circuit-controlling operation, and subsequently movable to an intermediate position to effect a different circuit-controlling operation.

6. A control system comprising non-closable switching mechanism including an operating structure, electro-magnetic means operatively associated with said structure, and means remote from said mechanism for energizing said electro-magnetic means for alternately moving said structure in each of two directions to effect a circuit-controlling operation and for de-energizing said electro-magnetic means to effect a different circuit-controlling operation.

7. A control system comprising a non-closable switching mechanism having a trip coil responsive to a circuit condition, means remote from said mechanism, and operating means controlled by said remote means for effecting the opening and closing of said switch and having means whereby said switch is responsive to a different circuit condition.

8. A control system comprising a controlled circuit, a non-closable switch in said circuit and having trip means responsive to a condition therein, a control circuit, means in said control circuit for effecting the opening and closing of said switch and including means forming part of said controlled circuit whereby said switch is responsive to a different circuit condition.

9. A control system comprising the combination with a non-closable circuit-breaker including a contact-operating member, an actuating member, and a detachable connection between said members, of electro-magnetic means for operatively connecting said actuating and operating member, electro-magnetic means for thereafter moving said actuating member whereby a circuit-controlling operation is effected, said last-named electro-magnetic means being effective to cause a different circuit-controlling operation upon change of energization, and means whereby said electro-magnetic means are separately and sequentially energized.

10. A control system comprising the combination with a non-closable circuit-breaker including a contact-operating member, an actuating member, and a detachable connection between said members, of electro-magnetic means responsive to circuit conditions for maintaining said switch in the closed-circuit position, means opposing said electro-magnetic means for opening said switch whereupon said detachable connection is broken, second electro-magnetic means, remote means for energizing said second electro-magnetic means to reset said detachable connection and for thereafter energizing said first electro-magnetic means to close and to hold closed said switching mechanism.

11. A control system comprising a controlled circuit, a circuit-breaker in said controlled circuit, means energized by said circuit to effect a circuit position of said breaker and to maintain said position during normal energization, means for effecting a different circuit position of said breaker in response to a change in the energization of said first means, said second means including means whereby said first means upon subsequent normal energization is ineffective to cause said first circuit position of said breaker.

12. A control system comprising a controlled circuit, a circuit-breaker in said controlled circuit, means energized by said circuit to effect a closed-circuit position of said breaker and to maintain said position during normal energization thereof, means for effecting an open-circuit position of said breaker in response to a change in the energization of said first means, said second means including means whereby said first means upon subsequent normal energization is ineffective to cause said first circuit position of said breaker.

13. A control system comprising a controlled circuit, a circuit-breaker in said controlled circuit, electro-magnetic means energized by said circuit to effect a circuit position of said breaker and to maintain said position during normal energization thereof, and means for effecting a different circuit position of said breaker in response to a change in the energization of said first means, said second means including means whereby said first means upon subsequent normal energization is ineffective to cause said first circuit position of said breaker.

14. A control system comprising a controlled circuit, a circuit-breaker in said controlled circuit, electro-magnetic means energized by said circuit to effect a closed-circuit position of said breaker and to maintain said position during normal energization thereof, and means for effecting an open circuit position of said breaker in response to a change in the energization of said first means, said second means including means whereby said first means upon subsequent normal energization is ineffective to cause said first circuit position of said breaker.

15. A control system comprising a controlled circuit, a circuit-breaker in said controlled circuit, electro-magnetic means energized by said circuit to effect a closed-circuit position of said breaker and to maintain said position during normal energization thereof, and means including said first means for effecting an open-circuit position of said breaker in response to an undue voltage drop in said controlled circuit, said second means also including means whereby said first means upon subsequent normal energization is ineffective to cause said first circuit position of said breaker.

16. A control system comprising a controlled circuit, a circuit-breaker in said controlled circuit, electro-magnetic means energized by said circuit to effect a closed-circuit position of said breaker and to maintain said position during normal energization thereof, means including said first means for effecting an open-circuit position of said breaker in response to an undue voltage drop in said controlled circuit, said second means also including means whereby said first means upon subsequent normal energization is ineffective to cause said first circuit position of said breaker, and remote control means for effecting a change in the energization of said first-named means.

17. A control system comprising a switch, means energized to effect a preliminary movement of said switch, means energized to effect a final movement of said switch to a circuit-controlling position, said means upon a change of energization effecting a different circuit-controlling position of said switch, means to prevent said second means from effecting said first circuit position unless said second means is energized after and in sequential relation to said first means, and remote means to control the energization of said first and second means.

18. A control system comprising a switch, means energized to effect a preliminary movement of said switch, means energized to effect a final movement of said switch to a closed position, said means upon a change of energization effecting an open-circuit position of said switch, means to prevent said second means from effecting said closed position unless said second means is energized after and in sequential relation to said first means, and remote means to control the energization of said first and second means.

19. A control system comprising a switch, means energized to effect a preliminary movement of said switch, means energized to effect a final movement of said switch to a circuit-controlling position, means responsive to a circuit condition for effecting a different circuit-controlling condition of said switch, means to prevent said second means from effecting said first circuit position unless said second means is energized after and in sequential relation to said first means, and remote means to control the energization of said first and second means.

20. A control system comprising a switch having a trip-coil responsive to a circuit-condition, a circuit controlled thereby, means energized to effect a preliminary movement of said switch, means energized by said controlled circuit to effect a final movement of said switch to a circuit-controlling position, said means effecting a different circuit position of said switch in response to an unusual condition of said controlled circuit, and means to prevent said second means from re-effecting said first position unless said second means is energized after and in sequential relation to said first means.

21. A control system comprising a switch having a trip-coil responsive to a circuit-condition, a circuit controlled thereby, electromagnetic means operable when energized to effect a preliminary movement of said switch, electro-magnetic means connected to be energized by said controlled circuit and operable when so energized to effect a final movement of said switch to a circuit-controlling position, said means operable to effect a different circuit-position of said switch in response to a low voltage condition of said controlled circuit, means to prevent said second means from re-effecting said first position unless said second means is energized after and in sequential relation to said first means, and means operable to control energization of said electro-magnetic means.

22. A control system comprising non-closable switching mechanism including an operating structure, means operative for effecting an application of power to move said structure in one direction and for subsequently effecting movement of said structure in another direction to move said switching mechanism to a circuit-controlling position, means for storing energy by said last-named movement, said first-named means operative to effect release of energy stored in said second named means for causing movement of said switching mechanism to another position, and means forming part of said first-named means and disposed in a region remote from said mechanism.

23. A control system comprising non-closable switching mechanism including an operating structure, means including a remote switch movable to different positions for effecting an application of power to move said structure in one direction upon movement of said switch to one position and for effecting movement of said structure in another direction to a circuit-controlling position upon movement of said switch to another position, and means for storing energy by said last-named movement, said remote switch operative to effect release of energy stored in the aforesaid means for effecting movement of said switching mechanism to another position.

24. A control system comprising non-closable switching mechanism including an operating structure, means including a remote member movable to different positions and operable upon movement of said member to a given position to effect application of power to said structure to move it in one direction, said means operable upon movement of said member to a second position to effect application of power to move said structure in another direction and to hold it in a circuit-controlling position, and means opposing said last-named movement for storing energy in accordance therewith, said last-named means adapted to utilize the energy stored thereby to actuate said operating structure to another position.

25. A control system comprising non-closable switching mechanism including an operating structure, means including a remote member movable to different positions and operable upon movement of said member to a given position to effect application of power to said structure to move it in one direction to a latching position, said means operable upon movement of said member to a second position to effect application of power to move said structure to, and to hold it in a circuit-closing position, and resilient means opposing said last-named movement for storing energy in accordance therewith and adapted to utilize the stored energy to actuate said operating structure to move said switching mechanism to open position.

26. A control system comprising non-closable switching mechanism including an operating structure, means including a remote member movable to different positions and operable upon movement of said member to a given position to effect application of power to said structure to move it in one direction, said means operable upon movement of said member to a second position to effect application of power to move said structure in another direction to a circuit-controlling position and to hold it in such position, and means opposing said last-named movement for storing energy in accordance therewith, said last-named means adapted to actuate said operating structure to another position upon movement of said remote member to a third position.

27. A circuit breaker system comprising non-closable switching mechanism including an operating structure, electromagnetic operating means adapted to actuate said structure in one direction, other electromagnetic operating means adapted to be energized subsequent to deenergization of said first means for actuating said structure in another direction to a circuit-controlling position and to hold it in such position, a spring adapted to be placed under tension during and after completion of said last-named movement, said spring furthermore adapted to actuate said structure to another position in response to decrease to a predetermined extent of the energizing force of said second electromagnetic means, and means for controlling energization of said first and second-named electromagnetic operating means.

28. A control system comprising the combination with non-closable switching mechanism including a movable contact member, an operating member therefor, an actuating member, a disengageable connection between said operating and actuating members, and means for restraining said contact member in normal position, of an electro-motive device for actuating and controlling said movable contact member comprising a member movable in one direction for effecting operative connection between said actuating and operating members and movable in another direction for actuating said actuating and operating members to move said contact member to normal position, a spring compressed by said motive device during said movement of said contact member to normal position and adapted upon substantial reduction of degree of energization of said electro-motive device to trip said movable contact member, and means for controlling energization of said electro-motive device.

29. A control system comprising the combination with non-closable switching mechanism including a movable contact member, an operating member therefor, an actuating member, a disengageable connection between said operating and actuating members, and means for restraining said contact member in normal position, of an electro-motive device for actuating and controlling said movable contact member comprising a member movable in one direction for effecting operative connection between said actuating and operating members and movable in another direction for actuating said actuating and operating members to move said contact member to normal position, a spring compressed by said electro-motive device during said movement of said contact member to normal position and adapted upon substantial reduction of degree of energization of said electro-motive device to actuate said movable member of said electro-motive device in said one direction to trip said movable contact member, and means for controlling energization of said electro-motive device.

30. A control system comprising the combination with non-closable switching mechanism including a movable contact member, an operating member therefor, an actuating member, a disengageable connection between said operating and actuating members, and means for restraining said contact member in normal position, of an electro-motive device for actuating and controlling said movable contact member comprising a member movable in one direction for effecting operative connection between said actuating and operating members and movable in another direction for actuating said actuating and operating members to move said contact member to normal position, a spring compressed by said electro-motive device during said movement of said contact member to normal position and adapted upon substantial reduction of degree of energization of said electro-motive device to actuate said actuating member in a direction opposite that which effects movement of said contact member to normal position to trip said movable contact member, and means for controlling energization of said electro-motive device.

31. A control system comprising non-closable switching mechanism including an operating structure, motive means for actuating said switching mechanism, a power-transmitting member interposed between said structure and motive means, means controlling energization of said motive means for effecting movement of said power-transmitting member in one direction to cause said structure to perform a preliminary operation and for subsequently effecting movement of said member in the opposite direction to move said switching mechanism to closed position, and means opposing movement of said member in the last-named direction and exerting a bias thereon whereby decrease in energization of said motive means to a predetermined extent permits movement of said member in the biased or first-named direction to cause said switching mechanism to move to open position.

32. A control system comprising non-closable switching mechanism including an operating structure, electro-magnetic means for actuating said switching mechanism, a power-transmitting member interposed between said structure and electromagnetic means, means controlling energization of said electromagnetic means for effecting movement of said power-transmitting member in one direction to cause said structure to move into latching engagement with said switching mechanism and for subsequently effecting movement of said member in the opposite direction to move said switching mechanism to closed position, and resilient means opposing movement of said member in the last-named direction and exerting a bias thereon whereby decrease in energization of said electromagnetic means to a predetermined extent permits said biasing means to move said member in the first-named direction to break the latching engagement between said switching mechanism and structure and to thereby permit said mechanism to move to open position.

33. A control system comprising non-closable switching mechanism including an operating lever, electro-magnetic means for actuating said switching mechanism, a power-transmitting member interposed between said lever and electromagnetic means, means controlling energization of said electromagnetic means for effecting movement of said power-transmitting member in one direction to cause said lever to move into latching engagement with said switching mechanism and for subsequently effecting movement of said member in the opposite direction to move said switching mechanism to closed position, and a spring tensioned by movement of said member in the last-named direction whereby de-energization of said electromagnetic means permits said spring to move the power-transmitting member in the first-named direction to break the latching engagement between the switching mechanism and operating lever and to thereby permit said mechanism to move to open position.

WILLIAM M. SCOTT.